Figure 1:
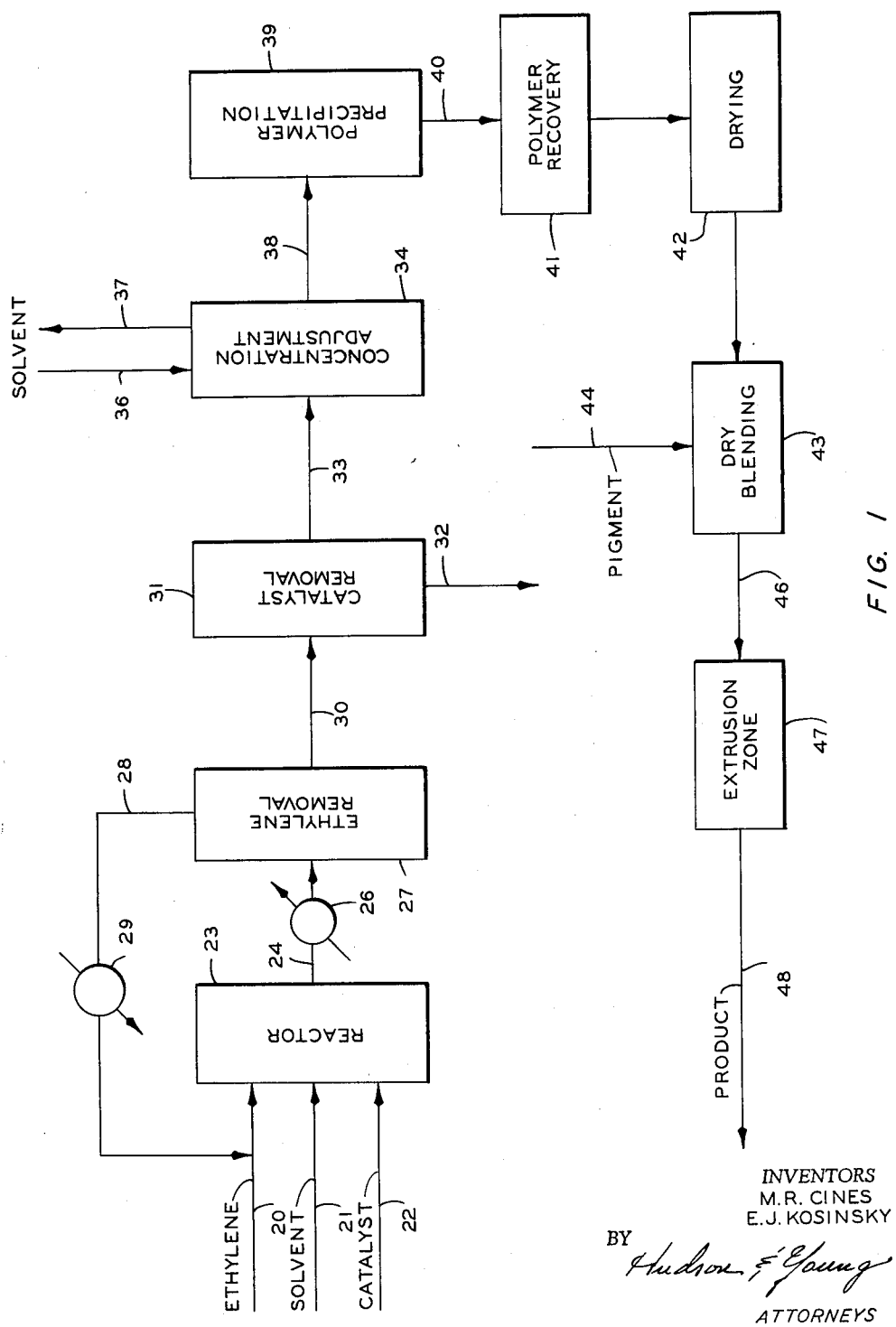

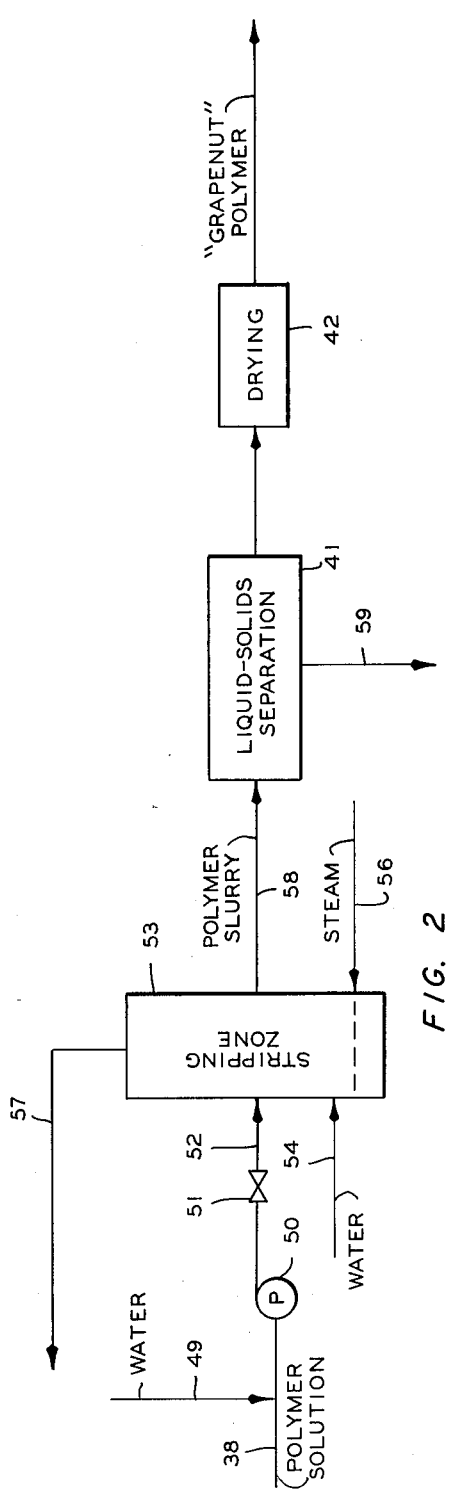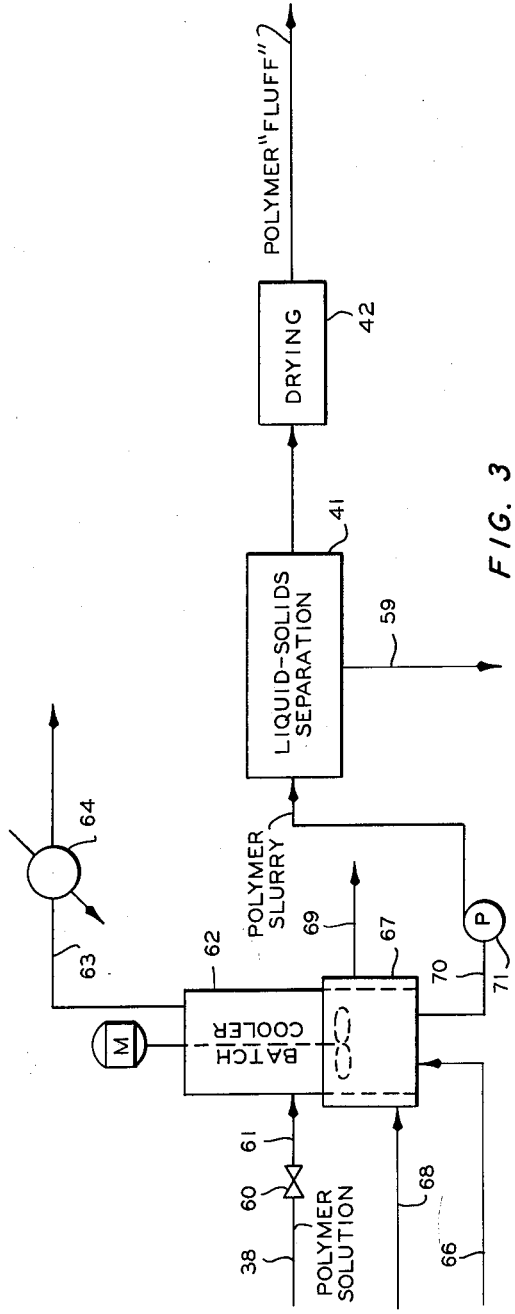

United States Patent Office 3,030,330
Patented Apr. 17, 1962

3,030,330
PIGMENTATION OF SOLID OLEFIN POLYMERS BY DRY BLENDING CELLULAR FORM THEREOF WITH CARBON BLACK
Martin R. Cines and Edward J. Kosinsky, Bartlesville, Okla., assignors to Phillips Petroleum Company, a corporation of Delaware
Filed Apr. 18, 1958, Ser. No. 729,357
9 Claims. (Cl. 260—41)

This invention relates to a method of obtaining a dispersion of additives in a solid olefin polymer. In another aspect this invention relates to a method of dispersing dry, particulate additives in a solid polymer of mono-1-olefins. In one of its more specific aspects this invention relates to a simplified method of pigmenting polyethylene directly as it is recovered from the polymerization process.

Conventional methods of incorporating pigment into solid resinous polymers of olefins such as polyethylene, polypropylene, copolymers of ethylene with other mono-olefins, and the like, involve mixing a powdered pigment with a pelletized polymer and subjecting the resultant mixture to mechanical working either in a Banbury or on a roll mill. In order to obtain satisfactory dispersions of pigment in the solid product on extrusion or injection molding, it is customary to employ an additional masterbatch step in which polymer pellets and a high amount of pigment are blended thoroughly on a roll mill or in a Banbury mixer and the resulting concentrate of polymer and pigment is used to color virgin polymer in the extrusion operation. Additives such as lubricants and surfactants have been used to help disperse the pigment, but these increase the cost of the finished, colored polymer. Attempts have been made to improve the pigment dispersion by granulating the polymer pellets before mixing with the pigment. This granulation step however is generally quite time consuming and involves additional cost.

We have discovered that satisfactory dispersions of solid additives in resinous olefin polymers can be obtained by dry blending the additive with a particular polymer form and subsequently subjecting the polymer-additive mixture to mechanical working, as in a plastics extruder. This polymer form which can be mixed effectively with a dry additive for subsequent extrusion is a light, fluffy, expanded form which has voids within the polymer particle and a bulk density in the range of about 8 to 22 pounds per cubic foot. Polymer in this form is considerably lighter than the pelletized material which has a bulk density in the range of about 32 to 38 pounds per cubic foot, depending upon the absolute density of the polymer. One of the major advantages of our invention resides in the fact that this polymer form can be obtained by normal recovery steps which are employed in low pressure polyolefin polymerization processes. These recovery steps involve the precipitation of solid particulate polyolefin from solution, either by evaporating the solvent, or by cooling the solution either indirectly or directly, as by addition of an immiscible liquid, such as water, to the solution. In one aspect, therefore, our invention comprises the steps of polymer recovery from solution by precipitation to form a fluffy, particulate solid, blending powdered pigment with the particulate polymer, and subjecting the resultant mixture to mechanical working which produces high shear forces within the polymer itself. Mechanical working of this type can be provided within plastics extruders using helical screws and/or dispersion plugs, in Banbury mixers, or on roll mills.

It is an object of our invention to provide an improved method of dispersing additives in solid olefin polymer.

It is another object to provide a method of incorporating pigment into resinous olefin polymers without the necessity of prolonged blending operations.

It is still another object of our invention to incorporate pigment into solid olefin polymers by direct mixing with the polymer as it is recovered from the polymerization solution and thereby eliminate the additional costly steps of extrusion and pelletizing and/or granulation prior to pigmentation.

Other objects, advantages and features of our invention will be apparent to those skilled in the art from the following discussion, claims and drawings, in which:

FIGURE 1 is a simplified flow diagram of a polyethylene polymerization process which includes polymer recovery and pigmentation according to our invention; and FIGURES 2 and 3 are simplified flow diagrams of two alternative methods of polymer precipitation.

The polymers into which pigment can be incorporated by the method of our invention are those normally solid thermoplastic polymers which can be precipitated from solution into a fluffy, spongy form and are relatively tough, having resistance to flow even when heated so that when subjected to mechanical working of the type described, the polymer itself will aid in breaking up agglomerates and dispersing particles of pigment or other solid additives in admixture therewith. Such polymers can be broadly defined as resinous polymers of mono-olefins which have from 2 to 8 carbon atoms per molecule. Examples of suitable 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, and the like. Solid polymers of ethylene can be obtained by copolymerization of ethylene with 30 percent or less, preferably less than 15 weight percent of the monomer system, of the comonomers propylene, 1-butene, and/or 2-butene.

Solid polymers can be prepared from mono-1-olefins having from 2 to 8 carbon atoms per molecule and no chain branching nearer the double bond than the 4-position by the method disclosed in U.S. Patent 2,825,721, issued March 4, 1958, to J. P. Hogan et al. This process involves contacting the monomer system with a catalyst comprising as the sole essential ingredient chromium oxide associated with at least one porous oxide selected from the group consisting of silica, alumina, zirconia and thoria. The catalyst generally contains between 0.1 and 10 or more weight percent chromium as chromium oxide and a substantial portion of the chromium is in the hexavalent state. Polymerization can be carried out in the gas phase but preferably an inert diluent is employed and the pressure of the reaction is sufficient to maintain the diluent in the liquid phase. The temperature of the reaction is generally in the range of about 100 to 500° F. When the polymerization is carried out using the hydrocarbon diluent and the polymer is formed in solution in this diluent, our invention has special value because the desired polymer form for pigmentation can be obtained by precipitation steps which are ordinarily necessary for recovery of the polymer from solution. Solvents which are especially useful in the polymerization process are paraffins and cycloparaffins having from 3 to 12, preferably 5 to 12, carbon atoms per molecule. The solvent should be relatively inert, nondeleterious, and liquid under the operating conditions. Suitable diluents include propane, isobutane, normal pentane, isopentane, isooctane, cyclohexane, methylcyclohexane, and the like.

While the above method employing the chromium oxide catalyst is preferred to produce the polymer form for our invention, other methods of polymerizing ethylene or other 1-olefins to solid, resinous materials can be employed. For example, solid ethylene polymers can be prepared with other low pressure processes which employ catalyst systems containing a group IV metal halide and an organometal or an organometallic halid as disclosed in the copending U.S. patent application of H. D. Lyons and Gene Nowlin, Serial No. 495,054, filed March 17, 1955. Also, conventional methods of polymerizing ethylene by processes using extremely high pressures can be used, in which case the polyethylene is dissolved in a solvent and precipitated, as subsequently described, in order to place it in the desired form for pigmentation. When a polymer solution is not a product of the polymerization process, such a solution can be formed for subsequent polymer precipitation. In this case, solvents can be used with are not ordinarily desirable in polymerization processes. For example, aromatic hydrocarbons such as benzene and xylenes, certain liquid olefins, and nonhydrocarbon solvents such as carbon disulfide, tetrachloroethane, and carbon tetrachloride can be used. We prefer, however, to practice our invention with solid, high density polymers of ethylene which are also highly crystalline, prepared by the low pressure processes described. These resinuous polymers include polyethylene and copolymers of ethylene with propylene, 1-butene and 2-butene as previously mentioned. These solid polymers have a density at 25° C. of at least 0.94 and preferably at least 0.955 gram per cubic centimeter. For the density determination the polymer sample is heated for 30 minutes at 250° F. and cooled slowly by allowing to stand in air at room temperature. Generally, the softening point of such a polymer is above 240° F., increasing as the density of the polymer increases to within a range of from 250 to 300° F. The softening temperature as used herein can be determined from softness measurements over a range of temperatures, softness being determined according to the method described by Karrer, Davis and Dieterich, Industrial and Engineering Chemistry (Analytical Edition) 2, 96 (1930). The softening temperature is the temperature at which the slope of the curve of "softness" plotted with temperature on the abscissa equals 0.0035 softening unit per degree F. This high density ethylene polymer is preferred for our invention because of the forces which can be obtained by mechanically working the mixture of polymer and pigment. By inducing high shear stresses which are possible with these polymers, a good dispersion of pigment can be readily obtained. However, satisfactory results are possible with the process of our invention as applied to any of the solid olefin polymers described.

The over-all process of polymerization and polymer recovery which provides the desired polymer form for pigmentation can best be described by referring to the drawings. In FIGURE 1, ethylene, solvent and catalyst are fed by lines 20, 21 and 22, respectively, to reactor 23. The polymerization is carried out on a continuous basis and the reactor effluent which includes a solution of polyethylene in hydrocarbon solvent with the catalyst in suspension passes from reactor 23 through line 24. The effluent is heated in heat exchanger 26 and passed to ethylene removal zone 27 wherein the unreacted monomer is flashed and removed through line 28. The ethylene is cooled by heat exchanger 29 and returned to the reactor with fresh ethylene.

The effluent then passes through line 30 to catalyst removal zone 31 which can include either filters or centrifuges or the like and catalyst is withdrawn through line 32. Polymer solution then passes through line 33 to concentration adjustment zone 34. Here polymer concentration is increased or decreased depending upon the method of polymer precipitation to be used and solvent is either added through line 36 or removed by evaporation through line 37. Polymer solution then passes through line 38 to precipitation zone 39 where the solid polymer is formed. A slurry of polymer and liquid passes by line 40 to polymer recovery zone 41 which includes filtration, centrifugation, settling, or the like, and the particulate polymer is then dried in zone 42. The polymer as thus recovered is a light, fluffy material which is either stringy or agglomerated particles, depending upon the conditions of precipitation used. In contrast to the smooth, solid, fused polymer which exists in the form of pellets or granules, this precipitate has a rough, spongy appearance and contains voids within the polymer particle. Generally, the particle size is not small because of apparent agglomeration, although particles of about 50 to 500 microns can be obtained.

Dry, fluffy polymer is blended in zone 43 with pigment 44 in powdered form by tumbling or any conventional mixing procedure for dry, particulate materials. While dry blending the polymer and pigment is certainly the simplest mixing procedure, other methods of spreading the pigment evenly throughout the polymer bulk can be used. For example the pigment can be dispersed in liquid carrier which is mixed with the polymer fluff and the carrier then evaporated. Pigment can be added to the polymer slurry or mixed with the wet polymer from separation zone 41 before drying.

When the pigment and polymer have been uniformly mixed, the mixture 46 is subjected to a mechanical working such as that provided by passage through a plastics extruder 47. Several types of suitable extruders are given in the examples of this specification. The mechanical working is of a nature which preferably subjects the polymer to maximum shear stresses. To achieve this, it is desirable to work the polymer below its thermal softening point and preferably at a temperature below its crystalline freezing point. In plastics extruders this can be achieved by controlling the feed rate or using a feed screw of a variable root diameter, the object being to achieve mastication of the polymer-pigment mixture without producing sufficient frictional heat to fuse the polymer. Steps which can be taken in conventional extruders toward this end include extending the length of the extruder barrel or combining the compound mills with the mill worms at a constant root diameter. The high shearing stresses which are produced in the polymer tend to cause the additive to break into smaller particles than were originally added. If the feed section of the extruder is held at as low a temperature as possible, maximum masticating of the polymer and additives is obtained. For this reason the highly crystalline, high density polymers are preferred because their greater rigidity and higher softening temperature enable better results in the dispersion of pigment through the production of shear stresses in polymer. Following the mastication of the mixture under such conditions the temperature of the polymer is increased so that the polymer is fused and can be extruded or molded into the desired form 48.

As previously stated, any type of solid, powdered additive can be incorporated into the 1-olefin polymers by our invention such as antioxidants, stabilizers, fillers, modifiers, etc., and the invention should not be considered limited to pigmentation. The pigments used in our invention are ordinarily commercial organic or inorganic pigments generally available in powdered form, such as carbon black, titanium dioxide, cadmium sulfide, chrome yellow, zinc oxide, iron blue pigments and the like. In fact, polymer-pigment concentrate in pellet or powdered form can be mixed with the virgin polymer fluff to produce the desired ultimate pigment loading.

FIGURES 2 and 3 show in further detail suitable processes by which 1-olefin polymers can be placed in the desired form for pigmentation according to our invention. Referring to FIGURE 2, polymer solution 38 is mixed with water 49 so that a dispersion of water and solvent in the liquid phase is formed. Dispersions can be made by a spray nozzle, colloid mill, mixing T, centrifugal pump, or the like. The dispersion temperature is regulated so that substantially all of the polymer is precipitated at a temperature below the softening point of the polymer. During this precipitation the pressure is sufficient to maintain the solvent and water as liquids. The resulting dispersion then passes through pump 50 and pressure reducing means 51, which can be a valve or preferably a nozzle or venturi, continuing through line 52 into steam stripping zone 53. By controlling the residence time of the water-solvent dispersion before it is passed into the stripping zone, substantially all of the polymer can be precipitated at a temperature of about 110 to 130° F. so that higher temperatures can be employed in the steam stripping zone. Additional water 54 can be added to the stripping zone and steam 56 is introduced to remove solvent which, with water vapors, leaves overhead through line 57. The temperature in the stripping zone should be maintained below the softening temperature of the polymer so that the particles formed by precipitation do not fuse together.

In a preferred operation hot polymer solution having a concentration in the range of 2–5 percent polymer is dispersed in 1 to 5 volumes of cool water to obtain the desired temperature under sufficient pressure to maintain a liquid phase. When the polymer is precipitated, the solvent is distilled off and the polymer recovered. Although the ranges given are preferred, higher or lower polymer concentrations and other solution-to-water ratios are operable. It is important, however, to precipitate the polymer before any substantial vaporization of the solvent and water is permitted. The above process for preparing such a precipitate is more fully described in the copending application of Robert G. Wallace, Serial No. 584,812, filed May 14, 1956, now abandoned, and a continuation-in-part, Serial No. 712,908, filed February 3, 1958.

The polymer in stripping zone 53, being lighter than water, floats and is removed as a slurry through line 58. The polymer solids and remaining liquid are separated by suitable means, as previously described, in zone 41, the particulate polymer passing on to drying step 42 and the liquid being removed through line 59. The polymer thus formed is a light, fluffy, agglomerated particle which has a spongy, porous appearance and a bulk density of about 13 to 22 pounds per cubic foot, generally about 16 to 20 pounds per cubic foot. Because of its appearance, this polymer has been termed "grapenut" polymer, or, using its method of precipitation, "water-precipitated fluff."

Referring to FIGURE 3, another method for preparing a suitable polymer form by a process described in copending application of W. James Wride, Serial No. 609,988, filed September 14, 1956, is shown. Polymer solution 38 passes through valve 60 and line 61 to a batch cooler 62. Polymer is precipitated from solution in this process by cooling the solution at a controlled, uniform rate, preferably by autorefrigeration, until the pressure reaches substantially atmospheric, followed by further cooling of the solution by direct or indirect heat exchange without vaporizing liquid from the solution.

To provide a homogeneous product of desired particle size it is necessary that the rate of cooling during autorefrigeration provide a controlled, uniform temperature drop in the polymer solution. When the cooling rate is too slow, an extremely fine particle is produced which is difficult to filter. Shock cooling, on the other hand, frequently produces a jellylike material which also presents recovery problems. In general, it is desirable to cool the solution between about 1° F. and about 20° F. per minute and preferably between about 5 to 15° F. per minute. A cooling rate of between about 6 to 9° F. per minute produces best results. A cooling rate employed during the supplemental cooling is also preferably within the above ranges although the major portion of the polymer is precipitated during the autorefrigeration.

Autorefrigeration is effected by reducing the pressure on the solution and removing solvent vapors through line 63 which are condensed in heat exchanger 64. Condensed solvent can be recycled to the cooler 62. When atmospheric pressure is reached, further cooling can be effected by drawing a vacuum on the cooler, but preferably by heat exchange either directly with the introduction of cooled solvent through line 66 or indirectly employing jacket 67, introducing coolant through line 68 and removing it through line 69.

The temperatures employed in the batch cooler 62 are determined by the temperature at which the polymer precipitates from solution. This, in turn, is a function of the molecular weight of the polymer and of the specific solvent used. For example, a substantial portion of ethylene polymer having a viscosity average molecular weight between about 15,000 and 25,000 will precipitate from isooctane at about 180° F. and from cyclohexane at about 165° F. Higher molecular weight ethylene polymer will precipitate at slightly higher temperatures. The concentration of polymer in the solvent entering the cooling zone should be at a relatively low level, usually between about 1 and 15 weight percent and preferably between about 3 and 6 weight percent. During precipitation the polymer is agitated to maintain the precipitate in suspension. Agitation should be controlled, however, to avoid producing excessively stringy polymer.

Polymer slurry is removed from cooler 62 through line 70 and is passed by pump 71 to liquids solids separation zone 41, as previously described in connection with the other precipitation operation. The dried product obtained by precipitation in this manner is a fluffy material which tends to be slightly stringy or fibrous but is more generally particulate in a size of about 50 to 500 microns. The bulk density of this material varies between about 8 to 20 pounds per cubic foot and more usually has a bulk density of about 12 to 16 pounds per cubic foot, being slightly lighter than the water-precipitated polymer. To differentiate from the "grapenut" polymer this polymer is termed "solvent-precipitated fluff."

The amount of pigment that can be incorporated into an olefin polymer by our method can be relatively high, for example, as high as about 30 weight percent of the mixture. Polymer-pigment concentrates are frequently prepared for further pigmentation steps in which virgin polymer is colored with such a concentrate. A 10 to 1 letdown ratio is normally the maximum used in commercial operations of this type so that for desired pigment loadings of from .25 to 5 percent in the ultimate product, pigment concentrates up to 20 weight percent can readily be prepared by our process.

Dry blending methods normally used in the plastics art are suitable for mixing pigment and polymer precipitate. A double cone blender is an example of one suitable type of tumbling or dry blending equipment. Blending times can be varied to suit the circumstances bearing in mind that overblending can result in pigment agglomeration. The optimum dry blending time, however, depends upon the pigment, polymer and equipment used.

To further illustrate the advantages of our invention the following examples are presented. The materials used and concentrations, as well as other specific conditions, are presented as typical and should not be construed to limit the invention unduly.

*Example I*

In order to compare dispersions of pigment in polyethylene utilized in its conventional pelletized form with dispersions prepared from polyethylene in its precipitated form, the following runs were made. The polyethylene in each case was a high density material prepared by the above-described process in the presence of a chromium oxide-containing catalyst. Typical properties were as follows:

| Property | Value | ASTM Test |
| --- | --- | --- |
| Density | 0.96 | |
| Melt Index | 0.6–0.8 | [1] D1238-52T |
| Stiffness, pounds per square inch | 140,000 | D747-50 |
| Softening Temperature, °F | 260 | |

[1] Modified by using 5 extrudate samples taken for 2 minutes each.

Cylindrical pellets were formed by heating polyethylene to a fluid state and extruding a cylindrical strand which was chopped in a pelletizer after the polymer had become solid. The smooth, solid pellets had a diameter and length of 3/16 of an inch.

A masterbatch of pellets and a medium color channel black, identified as Monarch 74, produced by Godfrey L. Cabot Co., was prepared by mixing pellets with 30 weight percent carbon black in a Banbury-type internal mixer for 20 to 25 minutes at 325° F. maximum temperature. This masterbatch was then let down with virgin polyethylene pellets in a National Rubber Machinery company single screw, vented extruder to a final composition of 3 percent black.

Ethylene was polymerized using cyclohexane as the solvent with a reactor temperature of 299° F. and a pressure of 420 pounds per square inch gauge to yield a polymer having a melt index of 0.78. The reactor residence time was 1.7 hours and the catalyst concentration in the reactor was 0.20 weight percent. The reactor effluent containing a polymer concentration of 8.1 weight percent was filtered to remove catalyst and the polymer was precipitated by cooling the solution from a temperature in the range of 280 to 300° F. to 120° F. at atmospheric pressure. The rate of cooling was maintained in the range of 5 to 10° F. per minute. The precipitated polymer was filtered and dried to yield a finely divided, powdery but cellular solid having a bulk density of 8.1 pounds per cubic foot and 99.86 percent solids. An antioxidant, Ionol (2,6-di-tert-butyl-4-methyl-phenol), was added to the polymer in the amount of 0.03 weight percent.

Polyethylene solvent precipitated fluff was dry blended with 3 percent Monarch 74 channel black in a double-cone blender for from 15 to 20 minutes. This mixture was then passed through the National Rubber Machinery extruder to complete the dispersion of pigment. In all runs extruder screw speeds were 150 revolutions per minute and the extrusion temperature varied between 375 and 400° F.

Photomicrographs were made of both extruder products and enlarged 100 times. Both dispersions rated satisfactory but the size of undispersed black particles was slightly smaller in the sample prepared from fluff.

*Example II*

A pellet masterbatch of Example I was let down to 3 percent black loading with virgin pellets in a double screw extruder manufactured by Welding Engineers, Inc.

Solvent precipitated fluff was dry blended with 3 percent channel black as in Example I and extruded through the Welding Engineers extruder.

Enlarged photomicrograph showed that the pellet mixture was satisfactory although several particles of undispersed black were present. The dry-blended fluff mixture, however, gave an excellent dispersion of pigment with substantially no undispersed particles.

Ethylene was polymerized at a reactor temperature of 273° F. and a pressure of 420 pounds per square inch gauge using cyclohexane as the solvent. The polyethylene formed after a residence time of 1.4 hours had an average melt index of 0.62. The reactor effluent containing a polymer concentration of 8.4 weight percent in solution was filtered to remove catalyst and the solution was diluted to 3.12 weight percent polymer. Polymer solution at 240° F. was mixed with water to produce a mix temperature of 110° F., thus precipitating solid polymer from solution. The cyclohexane was steam stripped from a slurry at 175° F. and 1 atmosphere pressure and the product skimmed to produce a slurry of 63.7 weight percent solid polymer in water. The polymer was dried to 98.4 percent solids and the resulting "grapenut" polymer was an expanded, irregular agglomerate about 1/32 to 1/16 of an inch in size and having a bulk density of 13 pounds per cubic foot. The polymer contained 0.03 weight percent Ionol as an antioxidant.

A Banbury masterbatch of the water precipitated "grapenut" polyethylene was prepared in the same manner as the pellet masterbatch with 30 percent Monarch 74 channel black. This masterbatch was let down to 3 percent black with unpigmented "grapenut" polymer in the Welding Engineers extruder. The photomicrograph of this product showed a satisfactory dispersion comparing favorably to the product from the pellet masterbatch.

*Example III*

Water precipitated "grapenut" polyethylene was dry blended with 3 percent Monarch 74 channel black in a double-cone blender for 15 to 20 minutes. The dry mixture was then passed through a welding engineer's double screw extruder having a reverse flight in the compound section of the screw. The extruded product was shown by photomicrograph to have an excellent pigment dispersion, superior to either of the masterbatch products of Example II.

*Example IV*

Runs using pellets in masterbatch and dry blended solvent precipitated fluff as in Examples I and II were repeated using an extruder manufactured by the Hartig Engine and Machine Company of Hillside, New Jersey. Enlarged photomicrographs showed both products to be satisfactory with slightly better dispersion of pigment in the fluff sample.

*Example V*

Water precipitated "grapenut" polyethylene was masterbatched with 25 percent "Kosmink" carbon black manufactured by United Carbon Company on a roll mill. The resultant masterbatch was let down with virgin "grapenut" polymer to 2 percent black in a "Ko-Kneader" modified extruder developed by Buss A.G. of Basel, Switzerland, and manufactured in the United States by Baker Perkins Company of Saginaw, Michigan.

A photomicrograph enlarged 100 times showed that excellent black dispersion was obtained in the finished product.

As shown by the above examples, pigmented polymer can be prepared directly from polymer in its light, precipitated form to give pigment dispersions which are equal or superior to dispersions prepared from conventional pellet masterbatches. Dry blended mixtures of both fluff and "grapenut" polyethylene with carbon black gave surprisingly fine results. Thus, not only are intermediate pelletizing operations made unnecessary by our invention but an improved product is obtained as well. These improved results can be obtained with a variety of types of extrusion processing equipment.

As will be evident to those skilled in the art, various modifications of this invention can be made or followed in the light of the foregoing disclosure and discussion without departing from the spirit or scope thereof.

We claim:

1. A method of incorporating carbon black into a solid polymer of mono-1-olefins having from 2 to 8 carbon atoms per molecule which comprises mixing said carbon black in its dry, particulate state with particles of said polymer to form a dry, granular mixture, said polymer having been precipitated from solution to place it in an expanded form having voids within the particle and having a bulk density of from about 8 to 22 pounds per cubic foot, and subjecting said mixture to mechanical working which produces high shear within the polymer, fusing said polymer, and extruding a uniform product.

2. A method of incorporating carbon black into a solid polymer of mono-1-olefins having from 2 to 8 carbon atoms per molecule which comprises forming a solution of said polymer in a solvent, precipitating said polymer from solution to form an expanded, granular solid having a bulk density of from about 8 to 22 pounds per cubic foot, mixing said carbon black with the polymer precipitate thus prepared to form a uniform dry, granular mixture, mechanically working said mixture to produce high shear within the polymer, fusing said polymer and extruding a uniform, solid product.

3. A method of producing a colored solid polymer of mono-1-olefins having from 2 to 8 carbon atoms per molecule which comprises forming a solution of said polymer in solvent, evaporating solvent from said solution, thereby cooling said solution, precipitating solid polymer from said solution by cooling thus forming light, expanded polymer particles having a bulk density between about 12 and 16 pounds per cubic foot, mixing carbon black with said polymer particles to form a dry, uniform mixture, mechanically working said mixture to produce high shear in said polymer, fusing said polymer and extruding solid polymer uniformly pigmented.

4. A method of producing a colored solid polymer of mono-1-olefins having from 2 to 8 carbon atoms per molecule which comprises forming a solution of said polymer in solvent, contacting said solution with water thereby precipitating cellular, agglomerated polymer particles having a bulk density of about 16 to 20 pounds per cubic foot, mixing carbon black with said polymer particles to form a dry, uniform mixture, mechanically working said mixture to produce high shear in said polymer, fusing said polymer, and extruding solid polymer uniformly pigmented.

5. A method of producing a colored solid polymer of mono-1-olefins having from 2 to 8 carbon atoms per molecule which comprises forming a solution of said polymer in a solvent, precipitating said polymer from solution to form cellular granular solids having a bulk density of from about 8 to 22 pounds per cubic foot, mixing carbon black with said granular polymer solids to form a uniform, dry mixture, said carbon black being in excess of its ultimate desired concentration, mechanically working and fusing said mixture to form a uniformly blended polymer-carbon black concentrate, pelletizing said concentrate, mixing said concentrate with additional unpigmented polymer, and mechanically working said concentrate and unpigmented polymer to form a uniformly colored product.

6. A method of incorporating carbon black into a normally solid polymer of a mono-1-olefin having from 2 to 8 carbon atoms per molecule which comprises dry mixing said carbon black with said polymer in a particulate cellular form which has been prepared by contacting a solution of said polymer in a liquid hydrocarbon solvent with water with agitation so that said polymer is precipitated at about 110 to 130° F. to form a slurry of said polymer in particulate form in water and hydrocarbon solvent and thereafter separating the polymer from the liquids, mechanically working the resulting mixture to produce high shear within the polymer, fusing said polymer, and shaping said polymer into a uniformly pigmented solid product.

7. A process according to claim 6 wherein said polymer is polyethylene.

8. A process according to claim 6 wherein said polymer is polyethylene having a density at 25° C. of at least about 0.955 and a softening temperature of at least about 250° F.

9. A method of incorporating carbon black into a normally solid polymer of a mono-1-olefin having from 2 to 8 carbon atoms per molecule which comprises dry mixing said carbon black with said polymer in a particulate cellular form which has been prepared by reducing the pressure on a solution of said polymer in a liquid hydrocarbon solvent so as to evaporate solvent and thereby cool said solution sufficiently at a rate of about 1 to 20° F. per minute so that said polymer is precipitated to form a slurry of said polymer in the unvaporized remainder of said hydrocarbon solvent and thereafter separating the polymer from the liquid, mechanically working the resulting mixture to produce high shear within the polymer, fusing said polymer, and shaping said polymer into a uniformly pigmented solid product.

References Cited in the file of this patent

UNITED STATES PATENTS

| | | |
|---|---|---|
| 2,582,327 | Haine | June 15, 1952 |
| 2,770,609 | Symonds | Nov. 13, 1956 |

OTHER REFERENCES

Goodwin: "Modern Plastics," August 1954, pages 104–105.